United States Patent
Wang et al.

(10) Patent No.: US 11,051,353 B2
(45) Date of Patent: Jun. 29, 2021

(54) PUCCH AND PUSCH DEFAULT BEAM CONSIDERING BEAM FAILURE RECOVERY

(71) Applicant: APPLE INC., Cupertino, CA (US)

(72) Inventors: Guotong Wang, Beijing (CN); Yushu Zhang, Beijing (CN); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/298,418

(22) Filed: Mar. 11, 2019

(65) Prior Publication Data

US 2019/0230730 A1    Jul. 25, 2019

(30) Foreign Application Priority Data

Mar. 19, 2018  (WO) ................ PCT/CN2018/079452
Mar. 20, 2018  (WO) ................ PCT/CN2018/079530

(51) Int. Cl.
| | | |
|---|---|---|
| *H04W 76/19* | (2018.01) | |
| *H04W 72/04* | (2009.01) | |
| *H04L 5/00* | (2006.01) | |
| *H04W 76/27* | (2018.01) | |
| *H04B 7/06* | (2006.01) | |

(52) U.S. Cl.
CPC .......... *H04W 76/19* (2018.02); *H04B 7/0695* (2013.01); *H04L 5/0048* (2013.01); *H04L 5/0053* (2013.01); *H04W 72/0413* (2013.01); *H04W 76/27* (2018.02)

(58) Field of Classification Search
CPC ..................................................... H04W 76/19
USPC ......................................................... 370/329
See application file for complete search history.

(56) References Cited

U.S. PATENT DOCUMENTS

| | | | |
|---|---|---|---|
| 2011/0250892 A1* | 10/2011 | Gupta ............... | H04W 36/0011 455/437 |
| 2018/0131492 A1* | 5/2018 | Wilson et al. ........ | H04L 1/0027 |
| 2018/0192371 A1* | 7/2018 | Jung .................... | H04B 7/0408 |
| 2018/0324865 A1* | 11/2018 | Hui ..................... | H04W 74/004 |
| 2019/0074882 A1* | 3/2019 | Zhou ...................... | H04L 5/005 |
| 2019/0199496 A1* | 6/2019 | Qin ......................... | H04B 7/063 |
| 2019/0207667 A1* | 7/2019 | Zhou ...................... | H04B 7/088 |
| 2019/0253941 A1* | 8/2019 | Cirik ................ | H04W 36/0077 |
| 2019/0268893 A1* | 8/2019 | Tsai ................... | H04W 74/0833 |
| 2019/0289638 A1* | 9/2019 | Kung .................... | H04L 1/1887 |
| 2020/0053717 A1* | 2/2020 | Zhou ...................... | H04L 5/0053 |
| 2020/0059398 A1* | 2/2020 | Pan ..................... | H04L 41/0654 |

(Continued)

*Primary Examiner* — Peter G Solinsky
(74) *Attorney, Agent, or Firm* — Fay Kaplun & Marcin, LLP

(57) ABSTRACT

An apparatus of a user equipment (UE) comprises one or more baseband processors to generate a beam failure recovery request to be transmitted to a Fifth Generation (5G) NodeB (gNB) over a physical random access channel (PRACH), to process a response from the gNB, and to generate a physical uplink control channel (PUCCH) transmission to be transmitted to the gNB using a default spatial relation comprising a same spatial filter as used for the beam failure recovery request transmission over the PRACH. A beam failure recovery request is to be transmitted to a gNB after a random access response from the gNB, wherein the beam failure recovery request is to be transmitted via Message 1 or Message 3 to the gNB, and a response is to be received from the gNB via Message 2 or Message 4.

15 Claims, 5 Drawing Sheets

(56) References Cited

U.S. PATENT DOCUMENTS

| | | | |
|---|---|---|---|
| 2020/0120715 A1* | 4/2020 | Zhang | H04W 74/0833 |
| 2020/0177424 A1* | 6/2020 | Noh | H04L 5/00 |
| 2020/0221508 A1* | 7/2020 | Huang | H04W 74/006 |
| 2020/0275524 A1* | 8/2020 | Wang | H04W 56/001 |
| 2020/0296736 A1* | 9/2020 | Yokomakura | H04W 72/04 |
| 2020/0351127 A1* | 11/2020 | Yokomakura | H04W 80/08 |

* cited by examiner

PUCCH AND PUSCH DEFAULT BEAM CONSIDERING BEAM FAILURE RECOVERY

CROSS-REFERENCE TO RELATED APPLICATIONS

The present application claims priority to International Patent Application No. PCT/CN2018/079530 (AA9587-PCT-Z) filed Mar. 20, 2018 and priority to International Patent Application No. PCT/CN2018/079452 (AA9588-PCT-Z) filed Mar. 19, 2018. Said Application No. PCT/CN2018/079530 and said Application No. PCT/CN2018/079452 are hereby incorporated herein by reference in their entireties.

BACKGROUND

During beam failure recovery procedure, the spatial relation configuration, which is the configuration of the downlink reference signal that can be used by the user equipment (UE) to determine transmit (Tx) beamforming from the acquired beam from the DL reference signal of the Rx beamforming, of the physical uplink control channel (PUCCH) or the physical uplink shared channel (PUSCH) are not valid any more due to the beam failure. After receiving from the Fifth Generation (5G) NodeB (gNB) of the beam failure recovery response, the UE could perform the transmission over PUCCH/PUSCH. Thus, a default spatial relation for PUSCH/PUCCH can be applied for the UE to assist Tx beamforming selection for transmission over PUCCH/PUSCH before new beam information is activated for PUSCH. For example, the default spatial relation could be the channel state information reference signal (CSI-RS) or synchronization signal (SS) physical broadcast channel (PBCH) beam (SS/PBCH) that the UE identifies as candidate beam during the beam failure recovery procedure.

In the current Third Generation Partnership Project (3GPP) New Radio (NR) Release-15 specification, the beam failure recovery is based on contention-free physical random access channel (PRACH). After detecting beam failure wherein all the serving physical downlink control channels (PDCCHs) fail, the UE could send beam failure recovery request over the PRACH with dedicated PRACH resource. The gNB could send a response to the beam failure recovery request over a dedicated CORESET.

Meanwhile, it has been agreed that the beam failure recovery request transmission could be based on the contention based PRACH. Some scheme, however, can be introduced to differentiate the beam failure recovery request and normal access. Otherwise, the gNB cannot know that the beam failure recovery request has been sent by the UE over the PRACH and cannot decide on the following procedures such as channel state information (CSI)/beam reporting, Transmission Configuration Indicator (TCI) update, and so on.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
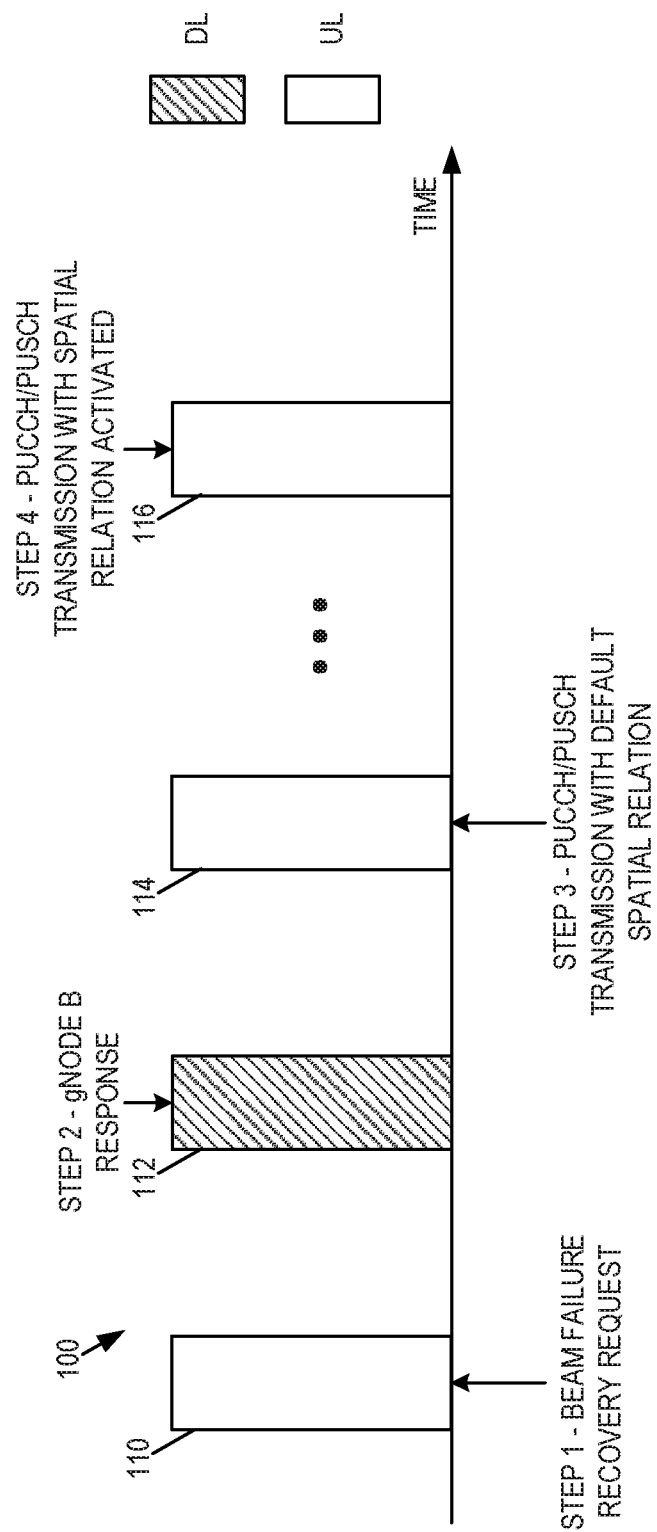
FIG. 1 is a diagram of an example of a default spatial relation for PUCCH/PUSCH in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an example of a default spatial relation for PUCCH/PUSCH in accordance with one or more embodiments will be discussed. In one or more embodiments, the default spatial relation for physical uplink control channel (PUCCH) and/or physical uplink shared channel (PUSCH) for non-contention based beam failure recovery can be as follows. In the event of a beam failure, after the user equipment (UE) sends a beam failure recovery request over non-contention based physical random access channel (PRACH), the UE monitors a control resource set (CORESET) for the Fifth Generation (5G) NodeB (gNB) response to the beam failure recovery request, which is a downlink control information (DCI) message addressed to the UE by using a cell radio network temporary identifier (C-RNTI).

After receiving the gNB response, the UE can perform the transmission over PUCCH/PUSCH. Due to the beam failure, however, the previous spatial relation configuration for PUCCH/PUSCH is not valid any more. Thus, a default spatial relation can be applied for the UE to facilitate transmission over PUCCH/PUSCH before new transmit (Tx) beam is activated for PUSCH. An example of such an operation 100 is shown in FIG. 1.

In one embodiment, the UE may send a beam failure recovery request 110 as Step 1 (STEP 1). After sending the beam failure recovery request 110 or after receiving the gNB response 112 as Step 2 (STEP 2) to the beam failure recovery request 110, the UE can send a PUCCH/PUSCH transmission 114 with a default spatial relation as Step 3 (MSG 3), which is the configuration of the downlink (DL) reference signal that can be used by the UE to determine Tx beamforming from the acquired beam from the DL reference signal of the Rx beamforming. The default spatial relation may be used for PUSCH transmission before the spatial relation is activated for PUSCH in message 116 as Step 4 (STEP 4). The default spatial relation can be the beam identified from certain channel state information reference signal (CSI-RS) or synchronization signal/physical broadcast channel (SS/PBCH) block that the UE identifies as candidate beam during the beam failure recovery procedure. In another example, the default spatial relation can be the acquired beam corresponding to the CSI-RS or SS/PBCH block over which the UE receives the gNB response 112 regarding beam failure recovery request. Alternatively, the default beam for PUSCH is the one over which the PRACH is delivered by the UE.

In one embodiment, after sending the beam failure recovery request or after receiving the gNB response 112 to the beam failure recovery request, the UE can apply a default spatial relation for PUCCH transmission before the spatial relation is configured and/or activated for PUCCH. The default spatial relation could be the beam acquired by the UE for CSI-RS or SS/PBCH block that the UE identifies as a candidate beam during the beam failure recovery procedure. Alternatively, the default spatial relation can be the beam acquired for CSI-RS or SS/PBCH over which the UE receives the gNB response 112 to the beam failure recovery request 110. Alternatively, the default beam for PUCCH is the one over which the PRACH is delivered by the UE.

In another embodiment, after sending the beam failure recovery request 110 or after receiving the gNB response 112 to the beam failure recovery request, if the spatial relation for PUCCH has been activated or the transmission over PUCCH has occurred, then the spatial relation for PUSCH can be the same as the latest PUCCH or the lowest PUCCH resource until it is activated for PUSCH.

In yet another embodiment, after sending the beam failure recovery request 110 or after receiving the gNB response 112 to the beam failure recovery request, if the spatial relation for PUSCH has been activated or the transmission over PUSCH has occurred, then the spatial relation for PUCCH can be the same as the spatial relation corresponding to the latest PUSCH until the spatial relation is configured/activated for PUCCH.

In one or more embodiments, the default spatial relation for PUCCH/PUSCH for contention based beam failure recovery can be as follows. With contention-based beam failure recovery, the UE delivers a beam failure recovery request 110 over contention based PRACH. The UE sends random access preamble over PRACH (MSG 1) and waits for the random access response addressed to a random access radio network temporary identifier (RA-RNTI) which can be Message 2 (MSG 2). The UE then transmits information over PUSCH (MSG 3). Then after receiving a message from the gNB, the contention is resolved.

Due to the beam failure, the spatial relation configuration is not valid any more for PUSCH/PUCCH. Thus, a default spatial relation can be applied for PUSCH/PUCCH transmission until the new spatial relation is activated.

In one embodiment, after sending the beam failure recovery request over contention based PRACH, the UE can apply a default spatial relation for PUSCH transmission including MSG 3 until the spatial relation is activated for PUSCH. The default spatial relation can be the beam corresponding to the CSI-RS or SS/PBCH block index that the UE identifies as candidate beam during the beam failure recovery procedure. Alternatively, the default spatial relation can be the beam corresponding to the CSI-RS or SS/PBCH block index over which the UE receives MSG 2 from the gNB. Alternatively, the default beam for PUSCH is the one over which the PRACH is delivered by the UE.

In another embodiment, after sending the beam failure recovery request over contention based PRACH, the UE can apply a default spatial relation for PUCCH transmission including MSG 3 until the spatial relation is activated for PUCCH. The default spatial relation can be the CSI-RS or SS/PBCH beam that the UE identifies as candidate beam during the beam failure recovery procedure. Alternatively, the default spatial relation can be the beam acquired by the UE from CSI-RS or SS/PBCH block index over which the UE receives MSG 2 from the gNB. Alternatively, the default beam for PUCCH is the one over which MSG 3 is delivered by the UE.

In one or more embodiments, a default spatial relation for PUCCH/PUSCH for PUCCH based beam failure recovery can be as follows. With PUCCH based beam failure recovery, the beam failure recovery request is delivered over PUCCH. In one embodiment, after sending the beam failure recovery request over PUCCH, the UE can apply a default beam for PUSCH transmission until the new spatial relation is activated for PUSCH. The default spatial relation is the same as the latest PUCCH or the lowest PUCCH resource until it is activated for PUSCH. In an embodiment, after sending the beam failure recovery request over PUCCH, the spatial relation for PUCCH can remain the same until it is activated for PUCCH.

One or more embodiments as discussed herein may be found in Section 6 (Link recover procedures) of Third Generation Partnership Project (3GPP) Technical Specification (TS) 28.213 V15.4.0 (2018 December) as follows.

A UE can be provided, for a serving cell, a set $\bar{q}_0$ of periodic CSI-RS resource configuration indexes by failureDetectionResources and a set $\bar{q}_1$ of periodic CSI-RS resource configuration indexes and/or SS/PBCH block indexes by candidateBeamRSList for radio link quality measurements on the serving cell. If the UE is not provided failureDetectionResources, the UE determines the set $\bar{q}_0$ to include periodic CSI-RS resource configuration indexes with same values as the RS indexes in the RS sets indicated by TCI-state for respective CORESETs that the UE uses for monitoring PDCCH and, if there are two RS indexes in a TCI state, the set $\bar{q}_0$ includes RS indexes with QCL-TypeD configuration for the corresponding TCI states. The UE expects the set $\bar{q}_0$ to include up to two RS indexes. The UE expects single port RS in the set $\bar{q}_0$.

The thresholds $Q_{out,LR}$ and $Q_{in,LR}$ correspond to the default value of rlmInSyncOutOfSyncThreshold, as described in [10, TS 38.133] for $Q_{out}$, and to the value provided by rsrp-ThresholdSSB, respectively.

The physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations or SS/PBCH blocks that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In non-DRX mode operation, the physical layer in the UE provides an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations and/or SS/PBCH blocks in the set $\bar{q}_0$ that the UE uses to assess the radio link quality and 2 msec. In DRX mode operation, the physical layer provides an indication to higher layers when the radio link quality is worse than the threshold $Q_{out,LR}$ with a periodicity determined as described in [10, TS 38.133].

Upon request from higher layers, the UE provides to higher layers the periodic CSI-RS configuration indexes and/or SS/PBCH block indexes from the set $\bar{q}_1$ and the corresponding L1-RSRP measurements that are larger than or equal to the $Q_{in,LR}$ threshold.

A UE can be provided a CORESET through a link to a search space set provided by recoverySearchSpaceId, as described in Subclause 10.1, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

The UE may receive by PRACH-ResourceDedicatedBFR, a configuration for PRACH transmission as described in Subclause 8.1. For PRACH transmission in slot n and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or TCI-StatesPDCCH-ToAddlist and/or TCI-StatesPDCCH-ToReleaseList.

After 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialrelationInfo [11, TS 38.321] or is provided PUCCH-SpatialrelationInfo for PUCCH resource(s), the UE transmits a PUCCH on a same cell as the PRACH transmission using a same spatial filter as for the last PRACH transmission
a power determined as described in Subclause 7.2.1 with
$q_u=0$, $q_d=q_{new}$, and l=0

After K symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0.

Figure 2:
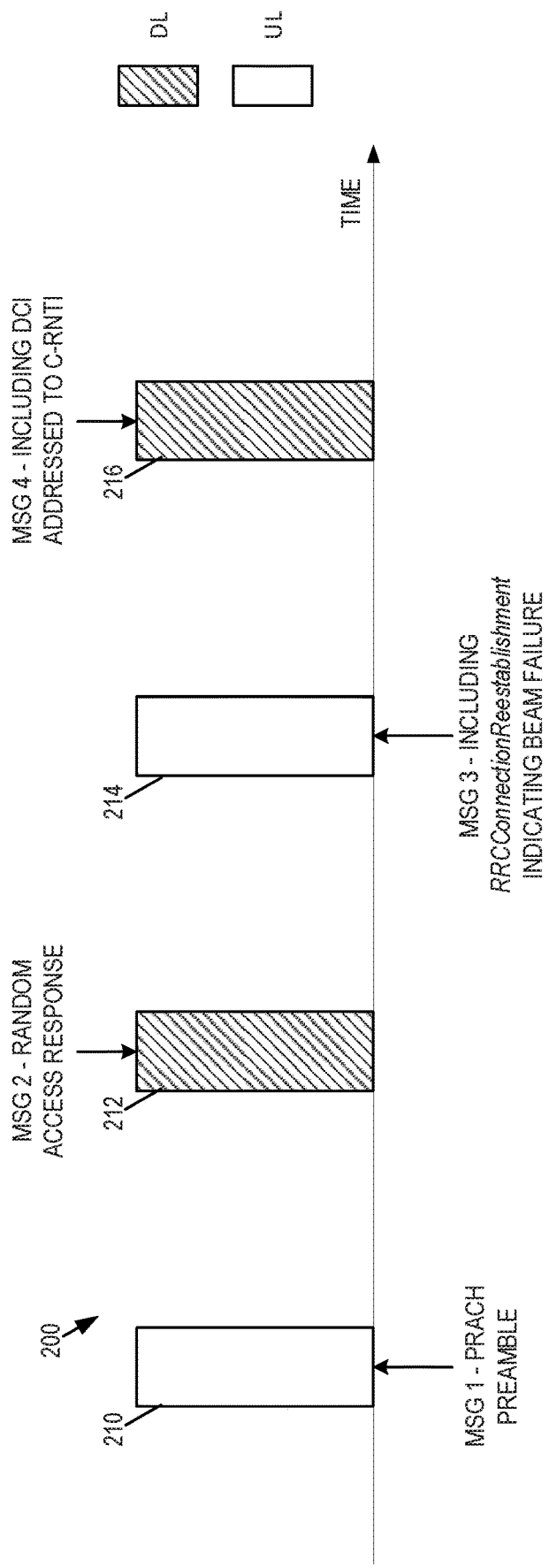
FIG. 2 is a diagram of an example of beam failure recovery request over Message 3 in accordance with one or more embodiments.

FIG. 2 is a diagram of an example of beam failure recovery request over Message 3 in accordance with one or more embodiments. Beam failure recovery over contention based PRACH can be transmitted over Message 3 (MSG 3) in the procedure 200 of FIG. 2. With contention-based beam failure recovery, the UE delivers a beam failure recovery request 210 over contention based PRACH. The UE sends random access preamble over PRACH as Message 1 (MSG 1) and waits for the random access response 212 addressed to RA-RNTI as Message 2 (MSG 2). The UE then transmits information over PUSCH via transmission 214 as Message 3 (MSG 3). Then after receiving a message 216 from the gNB as Message 4 (MSG 4), the contention is resolved.

The existing contention based PRACH, however, could be triggered by different events, for example, initial access, radio resource control (RRC) re-establishment, non-synchronized UL, scheduling request, etc. Thus, it is important for the gNB to know that the beam failure recovery request 210 has been sent by the UE over the PRACH so that the gNB can decide on the following procedures such as CSI/beam reporting, TCI update, and so on.

In one or more embodiments, beam failure recovery request over Message 3 can be as follows. Since for contention based PRACH, the UE does not have the dedicated PRACH resource for beam failure recovery, one possible solution is to send a beam failure recovery request over Message 3 (MSG 3). It could be added to an RRC message or a media access control (MAC) control element (CE), for example as shown in FIG. 2.

In one embodiment, for beam failure recovery over contention based PRACH, the beam failure recovery request is delivered implicitly or explicitly over Message 3 (MSG 3) wherein MSG 3 is treated as beam failure recovery request. In one embodiment, for contention based beam failure recovery, the UE can include an RRCConnectionReestablishmentRequest message in MSG 3 to request the reconfiguration. In an RRCConnectionReestablishmentRequest message, a new cause can be introduced to indicate the beam failure or link reconfiguration, that is for the element reestablishmentCause, a new value of "beamFailure" or "linkReconfiguration" can be added. If the RRC Connection Re-establishment procedure is initiated due to beam failure recovery or link reconfiguration, the reestablishmentCause can be set to the value "beamFailure" or "linkReconfiguration".

In another embodiment, a new MAC CE can be defined for beam failure recovery request. In MSG 3, the UE can include the C-RNTI and the MAC CE indicating beam failure recovery request. In yet another embodiment, for contention based beam failure recovery, the DCI addressed to C-RNTI after MSG 3 transmission or the MSG 4 can be viewed as the gNB response to the beam failure recovery request.

In an embodiment, after sending MSG 3, the UE can monitor the dedicated CORESET for the gNB response which is configured by higher layer parameter Beam-failure-Recovery-Response-CORESET. Alternatively, after sending MSG 3, the UE can monitor all the configured CORESETs and/or search space for the gNB response.

In a further embodiment, with the MSG 3 transmission in slot n, starting from slot n+x, the UE monitors PDCCH for a DCI format addressed to C-RNTI within a window configured by higher layer parameter Beam-failure-recovery-request-window. The parameter x is configurable and/or predefined, and the value of x could be up to the length of MSG 3, that is whether RRCConnectionReestablishmentRequest or MAC-CE indicating beam failure recovery request is delivered.

In an embodiment, if contention is resolved in MSG 4, the UE can treat it as the gNB response to beam failure recovery request has been received and the beam failure has been recovered. If contention is not resolved in MSG 4, the UE can treat it as the gNB response to beam failure recovery request is not received. The UE can restart the random access procedure or send an indication to an upper layer. In another embodiment, if an RRCConnectionReestablishmentRequest is sent in MSG 3, the gNB can include an RRCConnectionReestablishment or an RRCConnectionReestablishmentReject message in MSG 4.

In a further embodiment, for beam failure recovery request over non-contention/contention based PRACH, when the UE monitors all the allocated CORESETs, including the dedicated CORESET for beam failure recovery, if DCI is received over the CORESET except the dedicated one for beam failure recovery, the UE can treat it as a gNB response to the beam failure recovery request and the UE can reset the beam failure recovery procedure. Alternatively, the UE can discard the DCI and continue the beam failure recovery procedure until the gNB response over the dedicated CORESET is received. In another option, the UE would receive this DCI and assumes that the previous beam failure recovery request was not received by the gNB. In yet a further embodiment, for beam failure recovery over non-contention based PRACH, the gNB can trigger a RRC Connection Reconfiguration procedure after sending the gNB response to the beam failure recovery request so that some configuration could be updated, for example the TCI states.

In one or more embodiments, beam failure recovery request over Message 1 (MSG 1) can be as follows. Another solution is that the gNB can know that beam failure recovery request is delivered over the contention based PRACH during MSG 1 procedure. The UE selects PRACH preamble and/or resource from one group which is used for beam failure recovery.

In one embodiment, the PRACH resource are categorized into different groups. One group of multiple PRACH resources and/or preambles can be used for beam failure recovery. When initiating beam failure recovery request over contention based PRACH, the UE selects the PRACH resource and/or preamble in the group for beam failure recovery. Thus, the gNB can know from that PRACH preamble that it is a beam failure recovery request. Contention can happen since the resource is not dedicatedly configured per UE. Consequently, the gNB can configure a common search space and/or CORESET. Message 2 (MSG 2) is delivered over the search space and/or CORESET which is addressed to RA-RNTI. After sending the PRACH, the UE can monitor the common search space and/or CORESET for the gNB response.

In another embodiment, the gNB can configure a common search space and/or CORESET. The random access response (MSG 2) is delivered over the search space and/or CORESET which is addressed to RA-RNTI. After sending the PRACH, the UE can monitor the common search space and/or CORESET for the gNB response. Alternatively, MSG 2 can be transmitted via a dedicated CORSET for beam failure recovery. In a further embodiment, in MSG 2, the gNB can trigger the beam quality reporting, and consequently the UE can include the beam reporting in MSG 3. In yet a further embodiment, the UE can include the beam quality reporting in MSG 3 if it is triggered by the DCI in MSG 2, and the UE can include RRCConnectionReestablishmentRequest message in MSG 3.

In an additional embodiment, after sending MSG 3, the UE can monitor the dedicated CORESET for the gNB response which is configured by higher layer parameter Beam-failure-Recovery-Response-CORESET. Alternatively, after sending MSG 3, the UE can monitor all the configured CORESETs and/or search space for the gNB response.

In yet an additional embodiment, after receiving MSG 3, the gNB can send DCI which is addressed to C-RNTI over the dedicated CORESET configured by higher layer parameter Beam-failure-Recovery-Response-CORESET. The DCI addressed to C-RNTI is treated as the gNB response to the beam failure recovery request. Message 4 (MSG 4) is sent over PDSCH which contains the RRCConnectionReestablishment message or RRCConnectionReestablishmentReject message.

In another embodiment, if contention is resolved in MSG 4, the UE treats it as a gNB response to beam failure recovery request has been received and the beam failure has been recovered. If the contention is not resolved, the UE treat it as a gNB response to beam failure recovery request is not received, and the UE can restart the random access procedure or indicate to higher layers. Note that if a dedicated CORSET is used for beam failure recovery by contention based PRACH, the UE monitors this dedicated CORSET after it receives the beam failure recovery response in MSG 2 or MSG 4. The UE would not monitor this CORSET after a new CORSET is configured or the beam for previous one or more CORSETs are reconfigured.

Figure 3:
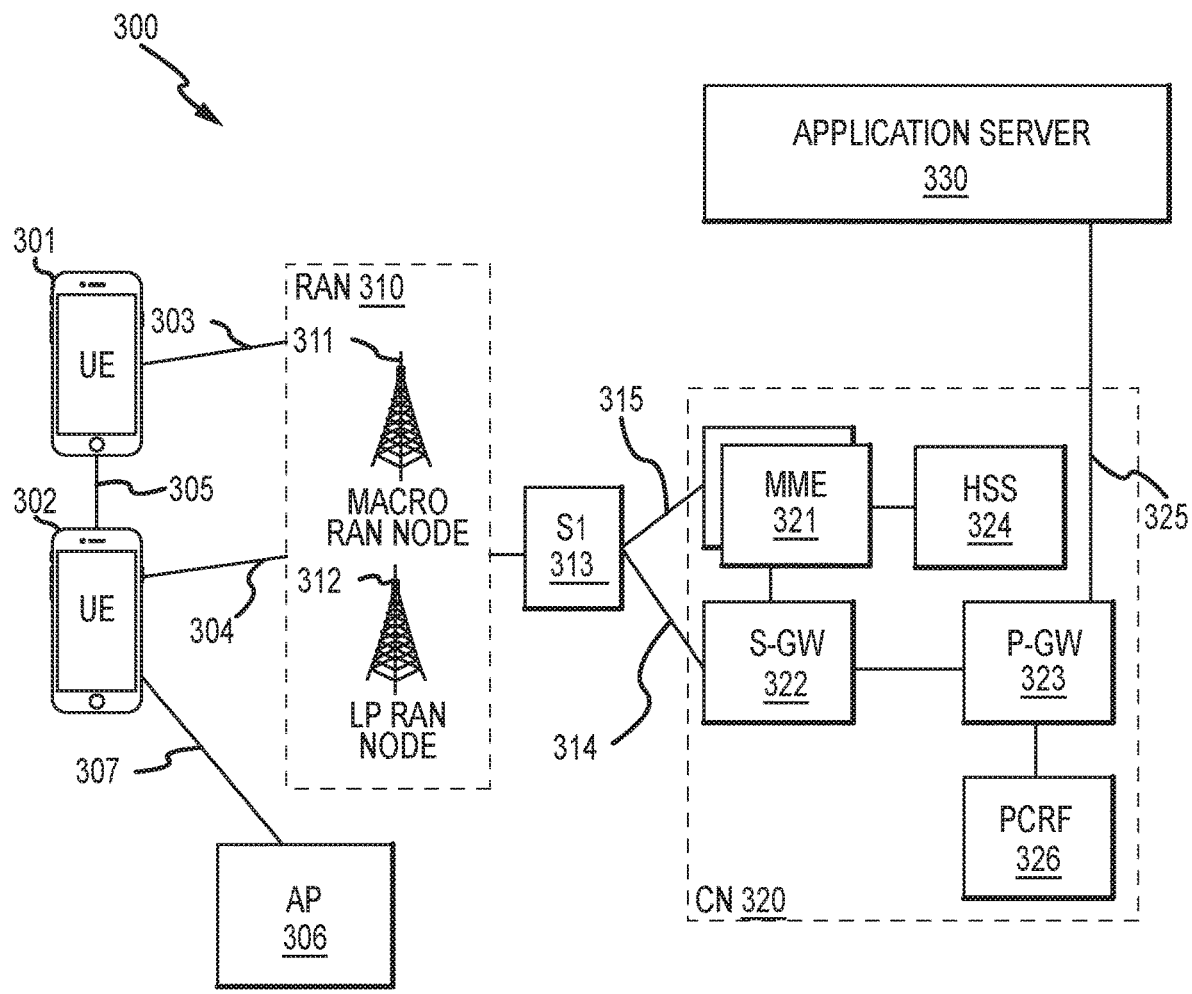
FIG. 3 illustrates an architecture of a system 300 of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management, and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
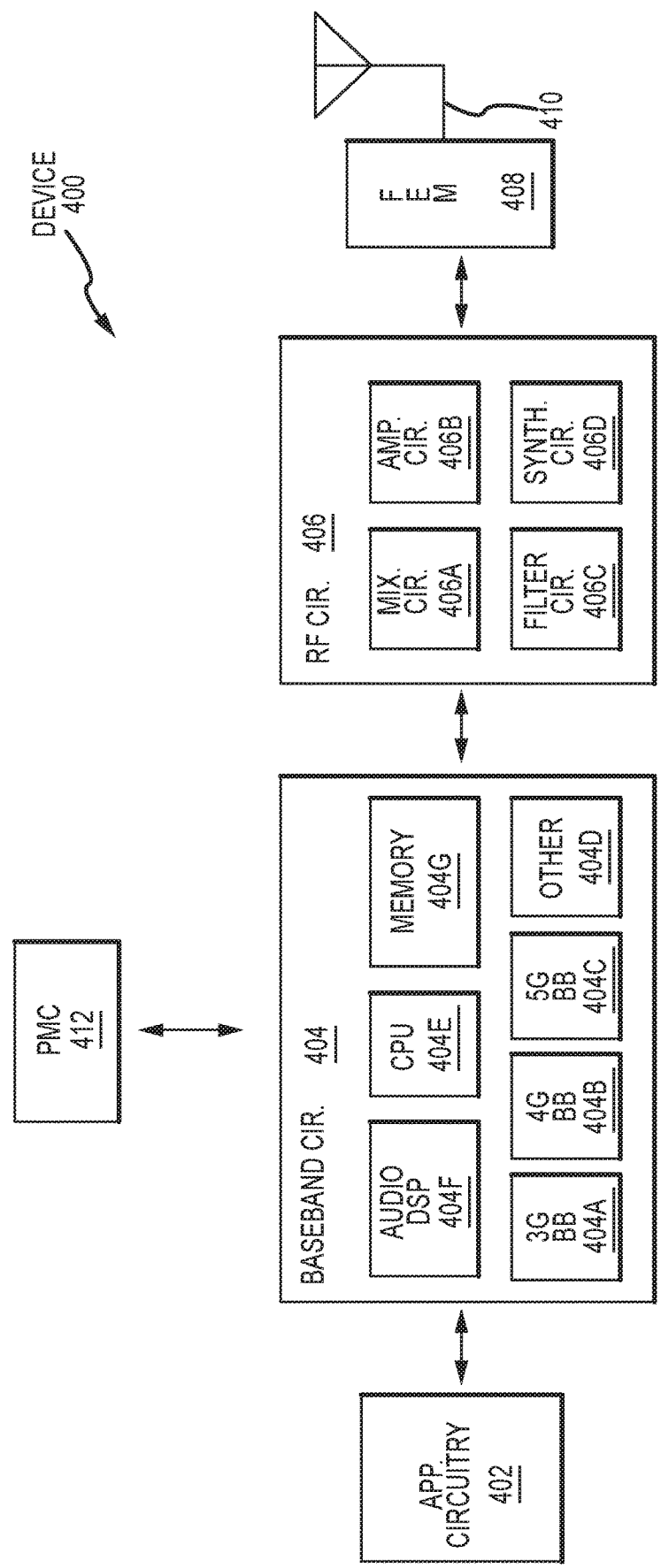
FIG. 4 illustrates example components of a device 400 in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. However, in other embodiments, the PMC 412 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
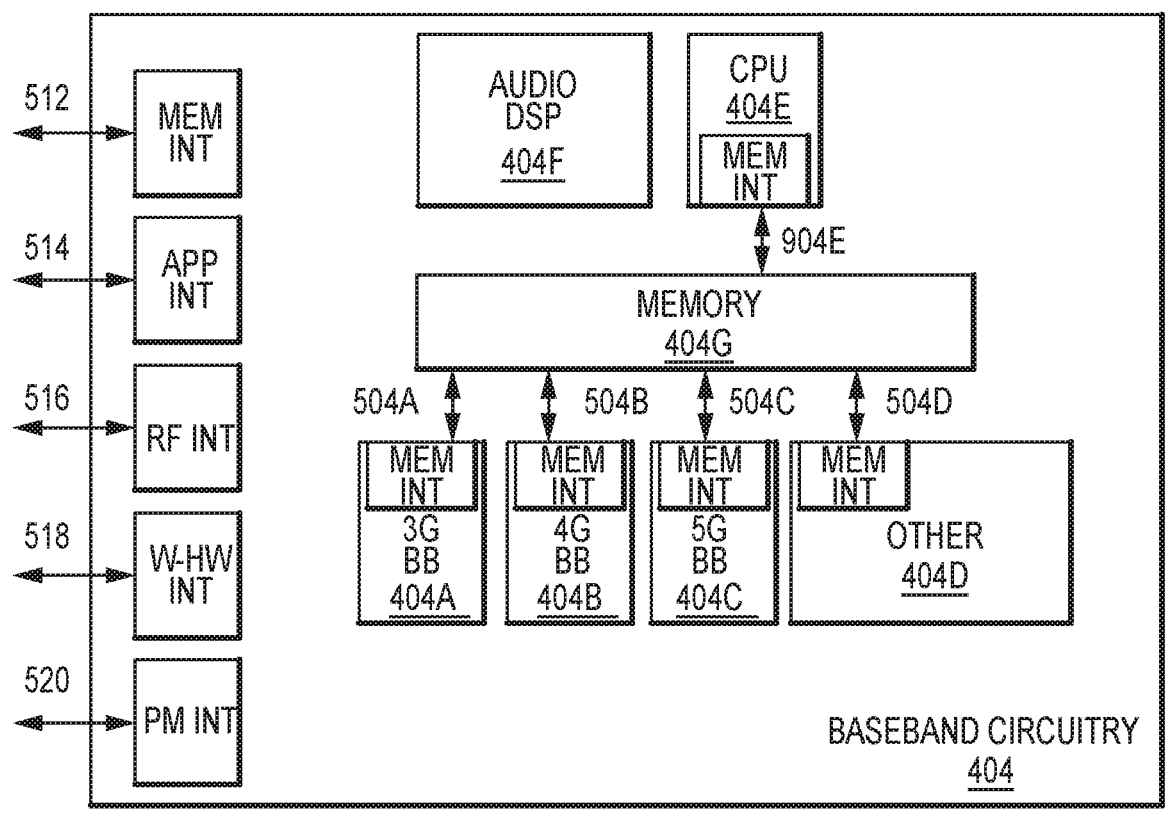
FIG. 5 illustrates example interfaces of baseband circuitry in accordance with some embodiments.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

Although the claimed subject matter has been described with a certain degree of particularity, it should be recognized that elements thereof may be altered by persons skilled in the art without departing from the spirit and/or scope of claimed subject matter. It is believed that the subject matter pertaining PUCCH and PUSCH default beam considering beam failure recovery and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to generate a beam failure recovery request to be transmitted to a Fifth Generation (5G) NodeB (gNB) over a physical random access channel (PRACH), to process a response received from the gNB, and to generate a physical uplink control channel (PUCCH) transmission to be transmitted to the gNB using a spatial relation configuration for transmit beamforming comprising a same spatial filter as used for the beam failure recovery request transmission over the PRACH;
one or more antennas to receive signals from and transmit signals to the gNB; and
a memory to store the spatial relation configuration.

2. The apparatus of claim 1, wherein the PRACH comprises a contention based PRACH or a non-contention based PRACH.

3. The apparatus of claim 1, wherein the one or more baseband processors are to generate a physical uplink shared channel transmission (PUCCH) to be transmitted to the gNB using the spatial relation configuration.

4. The apparatus of claim 1, wherein the spatial relation configuration is used until a second different spatial relation configuration is activated by the gNB.

5. The apparatus of claim 1, wherein the spatial relation configuration comprises a beam identified from a channel state information reference signal (CSI-RS) or a synchronization signal/physical broadcast channel (SS/PBCH) block identified as a candidate during a beam failure recovery procedure, or an acquired beam corresponding to the CSI-RS or SS/PBCH block over which the response from the gNB was received.

6. The apparatus of claim 1, wherein the spatial relation configuration comprises a beam over which the PRACH is transmitted.

7. The apparatus of claim 1, wherein when a spatial relation configuration for PUCCH has been activated or the transmission over PUCCH has occurred, a spatial relation configuration for a physical uplink shared channel (PUSCH) transmission is a same spatial relation configuration as a latest PUCCH or a lowest PUCCH resource until the spatial relation configuration is activated for PUSCH.

8. The apparatus of claim 1, wherein when a spatial relation configuration or a physical uplink shared channel (PUSCH) has been activated or a transmission over PUSCH has occurred, a spatial relation configuration for PUCCH can be a same spatial relation configuration as the spatial relation configuration corresponding to a latest PUSCH until the spatial relation configuration is activated for PUCCH.

9. The apparatus of claim 1, wherein the beam failure recovery request is to be transmitted over a physical uplink control channel (PUCCH).

10. The apparatus of claim 1, wherein the spatial relation configuration is the same as the latest PUCCH or the lowest PUCCH resource until it is activated for PUSCH.

11. One or more non-transitory storage media having instructions thereon that, when executed by an apparatus of a user equipment (UE), result in:
generating a beam failure recovery request to be transmitted to a Fifth Generation (5G) NodeB (gNB) over a physical random access channel (PRACH);
processing a response received from the gNB; and
generating a physical uplink control channel (PUCCH) transmission to be transmitted to the gNB using a spatial relation configuration for transmit beamforming comprising a same spatial filter as used for the beam failure recovery request transmission over the PRACH.

12. The one or more non-transitory storage media of claim 11, wherein the PRACH comprises a contention based PRACH or a non-contention based PRACH.

13. The one or more non-transitory storage media of claim 11, wherein the instructions, when executed, further result in generating a physical uplink shared channel transmission (PUSCH) to be transmitted to the gNB using the spatial relation configuration.

14. The one or more non-transitory storage media of claim 11, wherein the special relation configuration is used until a spatial relation is activated by the gNB.

15. The one or more non-transitory storage media of claim 11, wherein the default spatial relation configuration comprises a beam identified from a channel state information reference signal (CSI-RS) or a synchronization signal/physical broadcast channel (SS/PBCH) block identified as a candidate during a beam failure recovery procedure, or an acquired beam corresponding to the CSI-RS or SS/PBCH block over which the response from the gNB was received.

* * * * *

UNITED STATES PATENT AND TRADEMARK OFFICE
CERTIFICATE OF CORRECTION

PATENT NO. : 11,051,353 B2  
APPLICATION NO. : 16/298418  
DATED : June 29, 2021  
INVENTOR(S) : Wang et al.

Page 1 of 1

It is certified that error appears in the above-identified patent and that said Letters Patent is hereby corrected as shown below:

In the Claims

Claim 3, Column 17, Line 32:
"channel transmission (PUCCH) to be transmitted to the gNB" should read "channel transmission (PUSCH) to be transmitted to the gNB"

Claim 14, Column 18, Line 39:
"11, wherein the special relation configuration is used until a" should read "11, wherein the spatial relation configuration is used until a"

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*